US009666885B2

(12) United States Patent
Bozzolo et al.

(10) Patent No.: US 9,666,885 B2
(45) Date of Patent: *May 30, 2017

(54) SOLID OXIDE FUEL CELL SYSTEM

(75) Inventors: Michele Bozzolo, Genoa (IT);
Cristiano Balestrino, Lasalle (CA)

(73) Assignee: LG Fuel Cell Systems, Inc., Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/342,952

(22) PCT Filed: Aug. 30, 2012

(86) PCT No.: PCT/GB2012/052118
§ 371 (c)(1),
(2), (4) Date: Mar. 5, 2014

(87) PCT Pub. No.: WO2013/038144
PCT Pub. Date: Mar. 21, 2013

(65) Prior Publication Data
US 2014/0242483 A1 Aug. 28, 2014

(30) Foreign Application Priority Data
Sep. 15, 2011 (GB) .................................. 1115925.8

(51) Int. Cl.
*H01M 8/04* (2016.01)
*H01M 8/04111* (2016.01)
(Continued)

(52) U.S. Cl.
CPC .... *H01M 8/04111* (2013.01); *H01M 8/04014* (2013.01); *H01M 8/04097* (2013.01);
(Continued)

(58) Field of Classification Search
CPC ......... H01M 8/04014; H01M 8/04097; H01M 8/04111; H01M 2008/1293; H01M 2250/402
See application file for complete search history.

(56) References Cited

U.S. PATENT DOCUMENTS 5,208,114 A * 5/1993 Uematsu et al. ............. 429/415
5,360,679 A * 11/1994 Buswell et al. ............. 429/414
(Continued)

FOREIGN PATENT DOCUMENTS

CN 1708872 A 12/2005
CN 1862862 A 11/2006
(Continued)

OTHER PUBLICATIONS

Search Report for corresponding GB Application No. 1115925.8, dated Oct. 26, 2011 (2 pgs.).
(Continued)

*Primary Examiner* — Muhammad Siddiquee
(74) *Attorney, Agent, or Firm* — Shumaker & Sieffert, P.A.

(57) ABSTRACT

A solid oxide fuel cell system (10) comprises a solid oxide fuel cell stack (12) and a gas turbine engine (14). The solid oxide fuel cell stack (12) comprises a plurality of solid oxide fuel cells (16). The gas turbine engine (14) comprises a compressor (24) and a turbine (26). The compressor (24) supplies oxidant to the cathodes (22) of the fuel cells (16) via an oxidant ejector (60) and the oxidant ejector (60) supplies a portion of the unused oxidant from the cathodes (22) of the fuel cells (16) back to the cathodes (22) of the fuel cells (16) with the oxidant from the compressor (24). The fuel cell system (10) further comprises an additional compressor (64), an additional turbine (66), a cooler (70) and a recuperator (72). The compressor (24) supplies oxidant via the cooler (70) to the additional compressor (64) and the addi-
(Continued)

tional compressor (64) supplies oxidant to the oxidant ejector (60) via the recuperator (72). The solid oxide fuel cell stack (12) supplies exhaust gases to the turbine (26) and the turbine (26) supplies the exhaust gases through the recuperator (72) to heat the oxidant flowing through the recuperator (72).

11 Claims, 3 Drawing Sheets

(51) Int. Cl.
- *H01M 8/04014* (2016.01)
- *H01M 8/04089* (2016.01)
- *H01M 8/124* (2016.01)

(52) U.S. Cl.
CPC ........... *H01M 2008/1293* (2013.01); *H01M 2250/402* (2013.01); *Y02B 90/12* (2013.01); *Y02E 60/50* (2013.01); *Y02E 60/521* (2013.01); *Y02E 60/525* (2013.01)

(56) References Cited

U.S. PATENT DOCUMENTS

| | | | |
|---|---|---|---|
| 5,413,879 A | 5/1995 | Domeracki et al. | |
| 6,255,010 B1 | 7/2001 | George et al. | |
| 7,118,818 B2 | 10/2006 | Agnew et al. | |
| 7,339,495 B2 | 3/2008 | Kavner et al. | |
| 2004/0062973 A1* | 4/2004 | Agnew et al. | 429/34 |
| 2004/0151964 A1 | 8/2004 | Finger et al. | |
| 2005/0019636 A1 | 1/2005 | Kwon et al. | |
| 2005/0042488 A1 | 2/2005 | Niedzwiecki et al. | |
| 2005/0079395 A1 | 4/2005 | Varatharajan | |
| 2006/0010866 A1 | 1/2006 | Rehg et al. | |
| 2006/0105207 A1* | 5/2006 | Lundberg | 429/13 |
| 2006/0210858 A1 | 9/2006 | Warrier et al. | |
| 2006/0251939 A1* | 11/2006 | Bandhauer et al. | 429/26 |
| 2007/0099057 A1 | 5/2007 | Ferrall et al. | |
| 2007/0163822 A1 | 7/2007 | Grieve | |
| 2008/0187789 A1* | 8/2008 | Ghezel-Ayagh | 429/13 |
| 2008/0289955 A1* | 11/2008 | Balestrino et al. | 204/274 |
| 2009/0309364 A1 | 12/2009 | Marconi | |
| 2012/0117979 A1 | 5/2012 | Facchinetti et al. | |
| 2012/0282534 A1* | 11/2012 | Braun et al. | 429/415 |
| 2014/0216036 A1 | 8/2014 | Bozzolo et al. | |
| 2015/0030947 A1* | 1/2015 | Saunders | H01M 8/04022 429/415 |

FOREIGN PATENT DOCUMENTS

| | | |
|---|---|---|
| EP | 0496011 A1 | 7/1992 |
| EP | 1523056 A2 | 4/2005 |
| EP | 1564830 A2 | 8/2005 |
| EP | 1659654 A1 | 5/2006 |
| JP | 62296371 | 12/1987 |
| JP | 04169073 A | 6/1992 |
| JP | 0729587 A | 1/1995 |
| JP | 4334870 | 8/2004 |
| JP | 2006501616 A | 1/2006 |
| WO | 9607560 | 3/1996 |
| WO | 9913521 A1 | 3/1999 |
| WO | 03021702 A1 | 3/2003 |
| WO | 2004032273 A2 | 4/2004 |
| WO | 2007048997 A2 | 5/2007 |
| WO | 2007063272 A2 | 6/2007 |
| WO | 2010089883 A1 | 8/2010 |

OTHER PUBLICATIONS

Examination Report for corresponding GB Application No. 1115925.8, dated Oct. 27, 2011 (3 pgs.).
Written Opinion for corresponding PCT Application No. PCT/GB2012/052118, dated Nov. 14, 2012 (11 pgs.).
Office Action from U.S. Appl. No. 14/342,942, dated Jun. 18, 2015, 13 pp.
Response to Office Action dated Jun. 18, 2015, from U.S. Appl. No. 14/342,942, 10 pp.
Office Action from U.S. Appl. No. 14/342,942, dated Jan. 8, 2016, 11 pp.
Response to Office Action filed Apr. 8, 2016, from U.S. Appl. No. 14/342,942, 9 pp.
Final Office Action from U.S. Appl. No. 14/342,942, dated Jun. 22, 2016, 13 pp.
Response to Final Office Action dated Jun. 22, 2016, from U.S. Appl. No. 14/342,942, filed Aug. 22, 2016, 3 pp.
Notice of Allowance from U.S. Appl. No. 14/342,942, dated Sep. 27, 2016, 9 pp.

* cited by examiner

SOLID OXIDE FUEL CELL SYSTEM

The present invention relates to a solid oxide fuel cell system and in particular to a solid oxide fuel cell system comprising a solid oxide fuel cell stack and a gas turbine engine.

WO2004032273A2 discloses a solid oxide fuel cell system comprising a solid oxide fuel cell stack and a gas turbine engine in which a portion of the unused oxidant leaving the cathodes of the solid oxide fuel cell stack is recycled with fresh oxidant supplied to the cathodes of the solid oxide fuel cell stack to preheat the fresh oxidant supplied to the cathodes of the solid oxide fuel cell stack. An oxidant ejector driven by the fresh oxidant is used to recycle the unused oxidant back to the cathodes of the solid oxide fuel cell stack.

A problem with this solid oxide fuel cell system is that the location of the oxidant ejector between a compressor of the gas turbine engine and the expander, turbine, produces a very large pressure loss and this requires a specific gas turbine engine to be designed for the solid oxide fuel cell system. The specific design of gas turbine engine increases the total cost of the solid oxide fuel cell system.

Accordingly the present invention seeks to provide a solid oxide fuel cell system which reduces, preferably, overcomes the above mention problem.

Accordingly the present invention provides a solid oxide fuel cell system comprising a solid oxide fuel cell stack and a gas turbine engine, the solid oxide fuel cell stack comprising at least one solid oxide fuel cell, each solid oxide fuel cell comprising an electrolyte, an anode and a cathode, the gas turbine engine comprising a compressor and a turbine arranged to drive the compressor, the compressor being arranged to supply oxidant to the cathode of the at least one solid oxide fuel cell via an oxidant mixer, the oxidant mixer being arranged to supply a portion of the unused oxidant from the cathode of the at least one solid oxide fuel cell back to the cathode of the at least one solid oxide fuel cell with the oxidant from the compressor, the solid oxide fuel cell system further comprising an additional compressor and an additional turbine arranged to drive the additional compressor, the compressor being arranged to supply oxidant to the additional compressor, the additional compressor being arranged to supply oxidant to the oxidant mixer and the solid oxide fuel cell stack being arranged to supply exhaust gases to the turbine.

The solid oxide fuel cell system may further comprise a cooler and a recuperator, the compressor may be arranged to supply oxidant via the cooler to the additional compressor, the additional compressor may be arranged to supply oxidant to the oxidant mixer via the recuperator, the solid oxide fuel cell stack may be arranged to supply exhaust gases to the turbine and the turbine may be arranged to supply the exhaust gases through the recuperator to heat the oxidant flowing through the recuperator.

The compressor may be arranged to supply a portion of the oxidant via the cooler to the additional compressor and the compressor may be arranged to supply a portion of the oxidant to the additional turbine.

The recuperator may be arranged to supply a portion of the oxidant supplied by the additional compressor to the oxidant mixer and the recuperator may be arranged to supply a portion of the oxidant supplied by the additional compressor to the additional turbine.

The cooler may be arranged to supply a portion of the oxidant supplied by the compressor to the additional compressor and the cooler may be arranged to supply a portion of the oxidant supplied by the compressor to the additional turbine.

The cathode of the at least one solid oxide fuel cell may be arranged to supply a portion of the unused oxidant to a combustor, the anode of the at least one solid oxide fuel cell is arranged to supply a portion of the unused fuel to the combustor and the combustor is arranged to supply at least a portion of the combustor exhaust gases to the turbine.

The combustor may be arranged to supply a portion of the combustor exhaust gases to the turbine.

The combustor may be arranged to supply the portion of the combustor exhaust gases to a first flow path through a heat exchanger and the oxidant mixer is arranged to supply the portion of the unused oxidant from the cathode of the at least one solid oxide fuel cell back to the cathode of the at least one solid oxide fuel cell with the oxidant from the compressor through a second flow path through the heat exchanger.

The additional compressor may be arranged to supply oxidant to an additional mixer via the recuperator, the combustor is arranged to supply the combustor exhaust gases to the additional mixer, the additional mixer is arranged to supply oxidant and the combustor exhaust gases to the first flow path through the heat exchanger.

The heat exchanger may be arranged to supply a first portion of the combustor exhaust gases and oxidant leaving the first flow path through the heat exchanger to the combustor and the heat exchanger is arranged to supply a second portion of the combustor exhaust gases and oxidant leaving the first flow path through the heat exchanger to the turbine.

The additional compressor may be a fan or a blower. The additional mixer may an additional ejector. The oxidant mixer may be an oxidant ejector.

The present invention also provides a solid oxide fuel cell system comprising a solid oxide fuel cell stack and a gas turbine engine, the solid oxide fuel cell stack comprising at least one solid oxide fuel cell, each solid oxide fuel cell comprising an electrolyte, an anode and a cathode, the gas turbine engine comprising a compressor and a turbine arranged to drive the compressor, the compressor being arranged to supply oxidant to the cathode of the at least one solid oxide fuel cell via an oxidant ejector, the oxidant ejector being arranged to supply a portion of the unused oxidant from the cathode of the at least one solid oxide fuel cell back to the cathode of the at least one solid oxide fuel cell with the oxidant from the compressor, the solid oxide fuel cell system further comprising an additional compressor and an additional turbine arranged to drive the additional compressor, the compressor being arranged to supply oxidant to the additional compressor, the additional compressor being arranged to supply oxidant to the oxidant ejector and the solid oxide fuel cell stack being arranged to supply exhaust gases to the turbine.

The present invention will be more fully described by way of example with reference to the accompanying drawings, in which.

Figure 1:
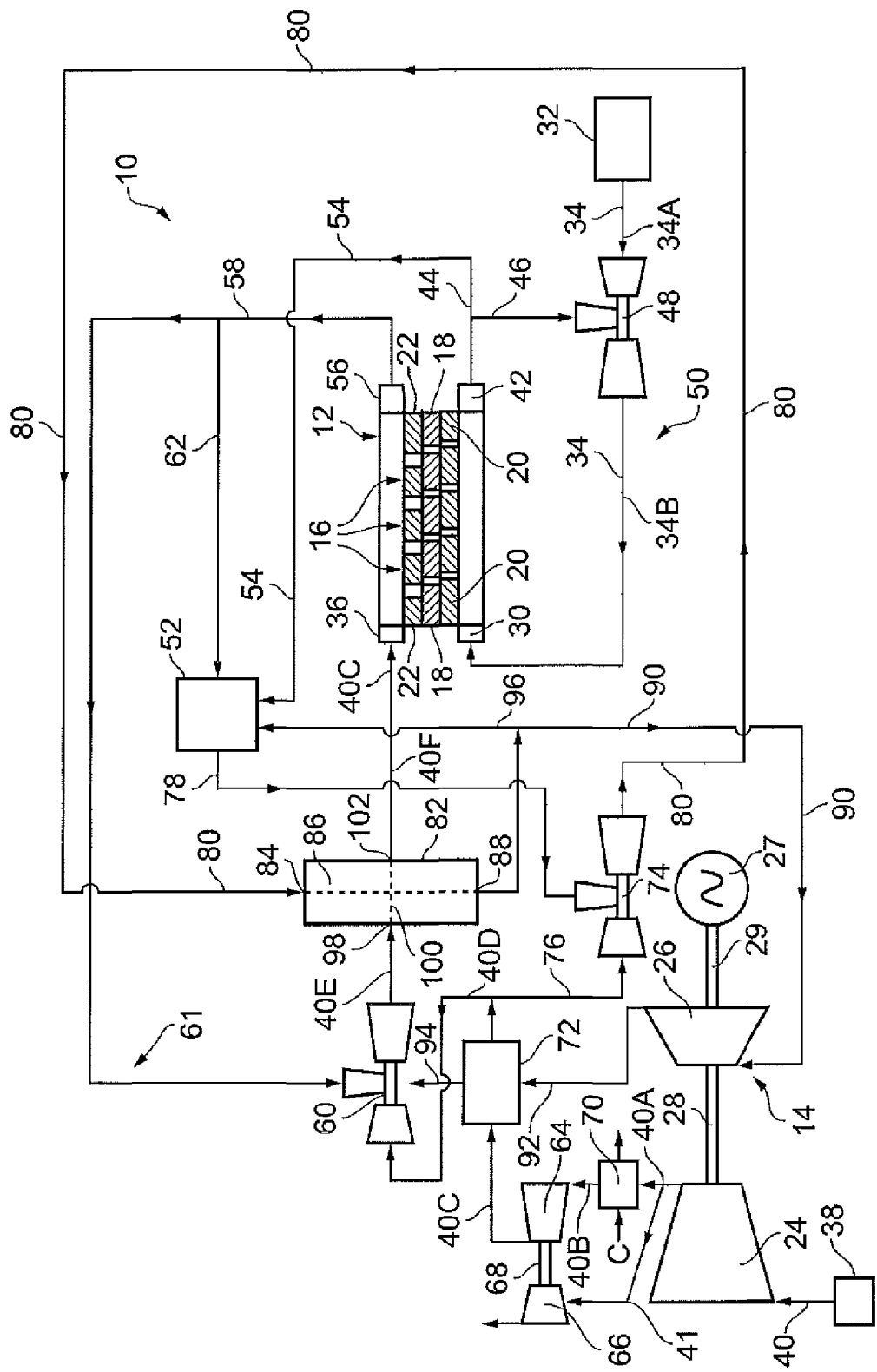
FIG. 1 is a solid oxide fuel cell system according to the present invention.

A solid oxide fuel cell system 10, as shown in FIG. 1, according to the present invention comprises a solid oxide fuel cell stack 12 and a gas turbine engine 14. The solid oxide fuel cell stack 12 comprises at least one solid oxide fuel cell 16 and each solid oxide fuel cell 16 comprises an electrolyte 18, an anode 20 and a cathode 22. The anode 20 and the cathode 22 are arranged on oppositely directed surfaces of the electrolyte 18.

The gas turbine engine 14 comprises a compressor 24 and a turbine 26 arranged to drive the compressor 24 via a shaft 28. The turbine 26 of the gas turbine engine 14 is also arranged to drive an electrical generator 27 via a shaft 29.

The anodes 20 of the solid oxide fuel cells 16 are supplied with a fuel, for example hydrogen, by a fuel manifold 30 and a fuel supply 32, for example hydrogen, is arranged to supply fuel to the fuel manifold 30 via duct 34. The cathodes 22 are supplied with an oxidant, for example oxygen, air etc, by an oxidant manifold 36 and an oxidant supply 38 is arranged to supply oxidant to the oxidant manifold 36 via a duct 40.

The compressor 24 is located in the duct 40 and pressurises the supply of oxidant to the oxidant manifold 36.

The anodes 20 are provided with an unused fuel collection manifold 42 into which unused fuel is discharged. The unused fuel collection manifold 42 is connected to the duct 34 via ducts 44 and 46 such that a portion of the unused fuel is supplied, recirculated, to the fuel manifold 30. A fuel ejector 48 is provided to induce the supply, recirculation, of unused fuel from the unused fuel collection manifold 42 to the fuel manifold 30. The ducts 44, 46 and the fuel ejector 48 form means 50 to supply, recirculate, unused fuel from the anodes 20 of the solid oxide fuel cells 16 back to the anodes 20 of the solid oxide fuel cells 16. The fuel ejector 48 pressurises the unused fuel and mixes the unused fuel with the fuel supplied by the fuel supply 32 through the duct 34 to the fuel manifold 30. Only fuel from the fuel supply 32 flows in a first portion 34A of the duct 34 between the fuel supply 32 and the fuel ejector 48. The fuel from the fuel supply 32 and the portion of the unused fuel from the anodes 20 of the solid oxide fuel cells 16 after mixing by the fuel ejector 48 is supplied through a second portion 34B of the duct 34 to the fuel manifold 30.

The unused fuel collection manifold 42 is also connected to a combustor 52 via the duct 44 and a further duct 54 such that a second portion of the unused fuel is supplied to the combustor 52.

The cathodes 22 of the solid oxide fuel cells 16 are provided with an unused oxidant collection manifold 56 into which unused oxidant is discharged. The unused oxidant collection manifold 56 is connected to the duct 40 via duct 58 such that a portion of the unused oxidant is supplied, recirculated, to the oxidant manifold 36. An oxidant ejector 60 is provided to induce the supply, recirculation, of unused oxidant from the unused oxidant collection manifold 56 to the oxidant manifold 36. The ducts 40 and 58 and the oxidant ejector 60 form means 61 to supply, recirculate, unused oxidant from the cathodes 22 of the solid oxide fuel cells 16 back to the cathodes 22 of the solid oxide fuel cells 16. The oxidant ejector 60 pressurises the unused oxidant and mixes the unused oxidant with the oxidant supplied by the compressor 24 through the duct 40 to the oxidant manifold 36. The compressor 24 is arranged to supply oxidant to the cathodes 22 of the solid oxide fuel cells 12 via the oxidant ejector 60, the oxidant ejector 60 is arranged to supply a portion of the unused oxidant from the cathodes 22 of the solid oxide fuel cells 16 back to the cathodes 22 of the solid oxide fuel cells 16 with the oxidant from the compressor 24.

The unused oxidant collection manifold 56 is connected to the combustor 52 via the duct 58 and a further duct 62 such that a second portion of the unused oxidant is supplied to the combustor 52.

The solid oxide fuel cell system 10 further comprises an additional compressor 64, an additional turbine 66, a cooler 70 and a recuperator 72. The additional turbine 66 is arranged to drive the additional compressor 64 via a shaft 68. The compressor 24 is arranged to supply a portion of the oxidant via a portion 40A of the duct 40, the cooler 70 and a portion 40B of the duct 40 to the additional compressor 64. A coolant C is supplied to the cooler 70 to cool the oxidant as it flow through the cooler 70. The compressor 24 is arranged to supply a portion of the oxidant directly, without passing through the cooler 70, via a duct 41 to the additional turbine 66. The additional turbine 66 expands the portion of the oxidant compressed by the compressor 24 to drive the additional compressor 64. The ratio of oxidant flowing from the compressor 24 via the cooler 70 to the additional compressor 64 to the oxidant flowing from the compressor 24 to the additional turbine 66 is about 4 to 1.

The additional compressor 64 is arranged to supply the oxidant via a portion 40C of the duct 40 to the recuperator 72 to heat the oxidant. A first portion of the heated oxidant is supplied from the recuperator 72 via a portion 40D of the duct 40 to the oxidant ejector 60 and a second portion of the heated oxidant is supplied from the recuperator 72 via a duct 76 to an additional ejector 74. The combustor 52 is arranged to supply hot exhaust gases via a duct 78 to a secondary inlet of the additional ejector 74. The additional ejector 74 mixes the portion of oxidant supplied from the recuperator 72 and the hot exhaust gases from the combustor 52. The outlet of the additional ejector 74 is arranged to supply the mixture of oxidant and exhaust gases via a duct 80 to a heat exchanger 82. The hot exhaust gases are supplied to a first inlet 84 of the heat exchanger 82 and flow thought a first path 86 within the heat exchanger 82 to a first outlet 88 of the heat exchanger 82. A portion of the mixture of hot exhaust gases and oxidant is then supplied from the first outlet 88 of the heat exchanger 82 to the turbine 26 through a duct 90. The hot exhaust gases drive the turbine 26 and then the hot exhaust gases flow through a duct 92 to the recuperator 72 and are discharged through an exhaust 94. A further portion of the mixture of oxidant and hot exhaust gases is supplied from the first outlet 88 of the heat exchanger 82 to the combustor 52 via a duct 96.

The oxidant ejector 60 is arranged to supply the oxidant supplied by the additional compressor 64 via the recuperator 72 and a portion 40D of the duct 40 and the unused oxidant supplied from the oxidant collection manifold 56 and the duct 58 via a portion 40E of the duct 40 to a second inlet 98 of the heat exchanger 82 and flows thought a second path 100 within the heat exchanger 82 to a second outlet 102 of the heat exchanger 82. The oxidant from the additional compressor 64 and the portion of the unused oxidant from the cathodes 22 of the solid oxide fuel cells 16 is then supplied from the second outlet 102 of the heat exchanger 82 to the oxidant manifold 36 via a portion 40F of the duct 40.

The solid oxide fuel cell stack 12 is arranged to supply exhaust gases to the turbine 26 and the turbine 26 is arranged to supply the exhaust gases through the recuperator 72 to heat the oxidant flowing through the recuperator 72.

The additional compressor 64 may be a fan or a blower.

The advantage of the present invention is that the use of the additional compressor, additional turbine, cooler and recuperator allows the use of a commercially available gas turbine engine rather than the development of a specific gas turbine engine to operate with a large pressure loss produced by an oxidant ejector recycling unused oxidant from the cathodes of the solid oxide fuel cells back to the cathodes of the solid oxide fuel cells. The additional compressor in particular increases the oxidant pressure, air pressure, at the inlet to the solid oxide fuel cell system and this allows the use of the oxidant ejector to drive the recycling of the unused oxidant, unused air, from the cathodes of the solid oxide fuel cells back to the cathodes of the solid oxide fuel cells. The use of the additional compressor enables a conventional gas turbine engine in which the compression ratio of the compressor is equal to the expansion ratio of the turbine compared to the development of an unconventional gas turbine engine in which the compression ratio of the compressor is greater than the expansion ratio of the turbine. The cooler reduces the additional power required by the additional compressor, for example reduces the power required by about 60%.

Figure 2:
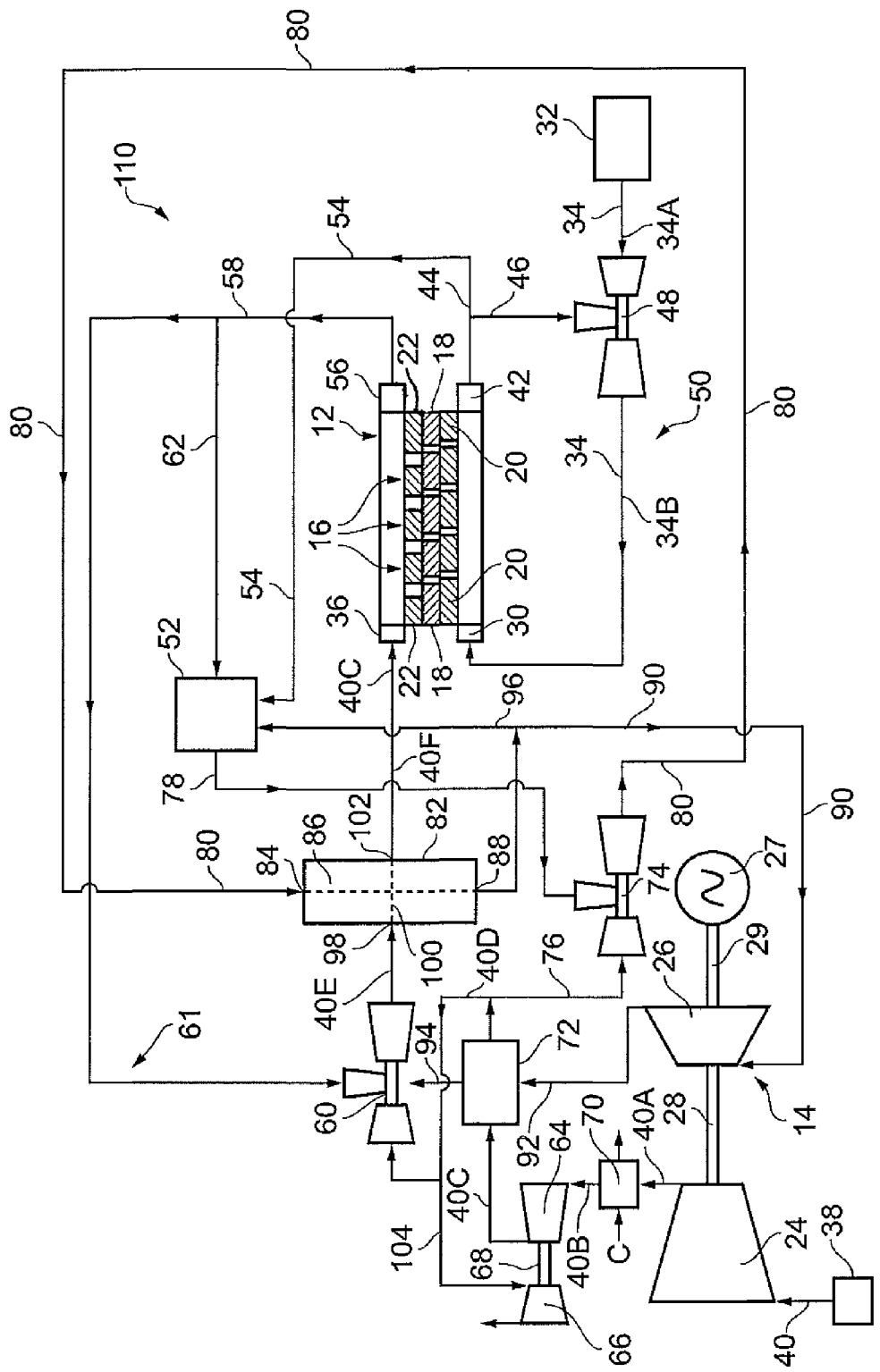
FIG. 2 is a further solid oxide fuel cell system according to the present invention.

An alternative solid oxide fuel cell system 110 according to the present invention is shown in FIG. 2 and the solid oxide fuel cell system 110 comprises a solid oxide fuel cell stack 12 and a gas turbine engine 14. The solid oxide fuel cell system 110 is substantially the same as the solid oxide fuel cell system 10 shown in FIG. 1, and like parts are denoted by like numerals.

The solid oxide fuel cell system 110 differs to the solid oxide fuel cell system 10 in that a third portion of the heated oxidant is supplied from the recuperator 72 via a portion 40D of duct 40 and a duct 104 to the additional turbine 66 rather than arranging the compressor 24 to supply a portion of the oxidant directly, without passing through the cooler 70, via a duct 41 to the additional turbine 66. Thus, the recuperator 72 is arranged to supply a portion of the oxidant supplied by the additional compressor 64 to the oxidant ejector 60 and the recuperator 72 is arranged to supply a portion of the oxidant supplied by the additional compressor 64 to the additional turbine 66.

Figure 3:
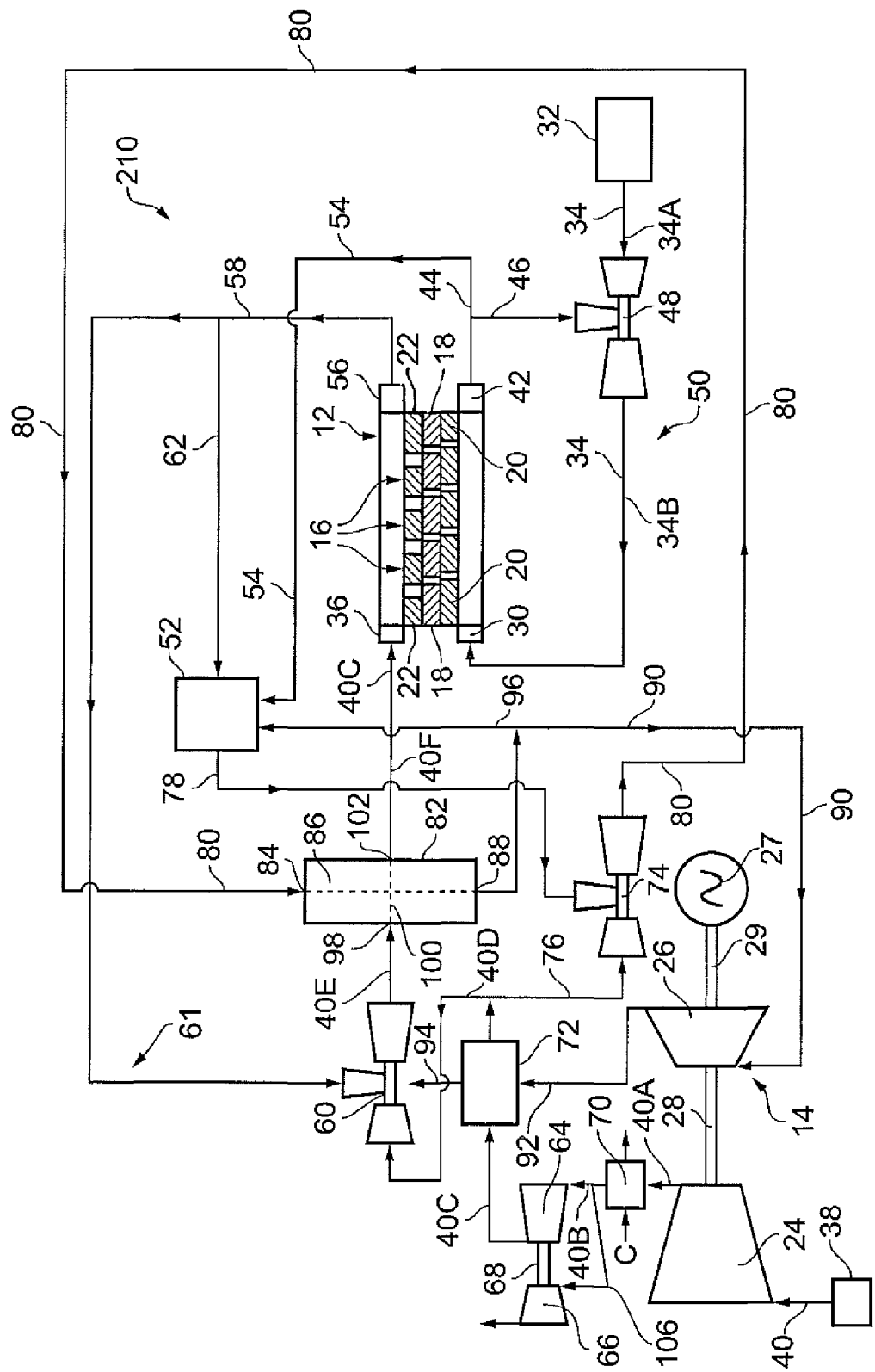
FIG. 3 is another solid oxide fuel cell system according to the present invention.

A further solid oxide fuel cell system 210 according to the present invention is shown in FIG. 3 and the solid oxide fuel cell system 210 comprises a solid oxide fuel cell stack 12 and a gas turbine engine 14. The solid oxide fuel cell system 210 is substantially the same as the solid oxide fuel cell system 10 shown in FIG. 1, and like parts are denoted by like numerals.

The solid oxide fuel cell system 210 differs to the solid oxide fuel cell system 10 in that a portion of the cooled oxidant is supplied from the cooler 70 via a duct 106 to the additional turbine 66 rather than arranging the compressor 24 to supply a portion of the oxidant directly, without passing through the cooler 70, via a duct 41 to the additional turbine 66. Thus, the cooler 70 is arranged to supply a portion of the oxidant supplied by the compressor 24 to the additional compressor 64 and the cooler 70 is arranged to supply a portion of the oxidant supplied by the compressor 24 to the additional turbine 66.

Although the present invention has been described with reference to a cooler in the flow path for the oxidant between the additional compressor and the compressor and a recuperator in the flow path for the exhaust gases from the turbine and in the flow path for the oxidant from the additional compressor to the oxidant ejector the present invention may equally well be used without the cooler, without the recuperator or without both the cooler and the recuperator.

It may be possible in each of the embodiments of the invention if the fuel supply 22 is a supply of a hydrocarbon fuel, e.g. an alkane, an alkene, an alcohol etc, for example methane, butane, propane, natural gas, ethanol etc, to provide a fuel reformer in the second portion 34B of the duct 34 supplying fuel to the fuel manifold 30 and the anodes 20 of the solid oxide fuel cells 16. The fuel reformer may be arranged to be heated by unused oxidant exiting the cathodes 22 of the solid oxide fuel cells 16 for example in the oxidant collection manifold 56 or the duct 58 etc.

It may be possible in each of the embodiments of the invention to provide a mechanical brake, an electrical brake or an electrical generator on the shaft 68, the additional compressor 64 or the additional turbine 66 to control the speed of rotation of the additional turbine 66 and the additional compressor 64.

Although the present invention has been described with reference to an oxidant ejector, it may be possible to use another type of oxidant mixer which mixes unused oxidant supplied from the unused oxidant collection manifold with fresh oxidant supplied by the compressor from the oxidant supply. Although the present invention has been described with reference to an additional ejector it may be possible to use another type of additional mixer. Although the present invention has been described with reference to a fuel ejector it may be possible to another type of fuel mixer which mixes unused fuel from the unused fuel collection manifold with fresh fuel from the fuel supply.

The invention claimed is:

1. A solid oxide fuel cell system comprising a solid oxide fuel cell stack and a gas turbine engine, the solid oxide fuel cell stack comprising at least one solid oxide fuel cell, each solid oxide fuel cell comprising an electrolyte, an anode and a cathode, the gas turbine engine comprising a compressor and a turbine arranged to drive the compressor, the compressor being arranged to supply oxidant to the cathode of the at least one solid oxide fuel cell via an oxidant mixer, wherein the cathode is arranged to supply a first portion of any unused oxidant to a combustor, the anode of the at least one solid oxide fuel cell is arranged to supply a first portion of any unused fuel to the combustor and the combustor is arranged to supply at least a portion of the combustor exhaust gases to the turbine, and wherein the cathode is arranged to supply a second portion of any unused oxidant to the oxidant mixer without passing through the combustor, the oxidant mixer being arranged to supply the second portion of the unused oxidant from the cathode of the at least one solid oxide fuel cell back to the cathode of the at least one solid oxide fuel cell with the oxidant from the compressor, wherein the solid oxide fuel cell system further comprises an additional compressor and an additional turbine arranged to drive the additional compressor, the compressor being arranged to supply oxidant to the additional compressor, the additional compressor being arranged to supply oxidant to the oxidant mixer and the solid oxide fuel cell stack being arranged to supply exhaust gases to the turbine, and wherein the oxidant mixer is an oxidant ejector, and wherein the solid oxide fuel cell system further comprises a cooler and a recuperator, the compressor being arranged to supply oxidant via the cooler to the additional compressor, the additional compressor being arranged to supply oxidant to the oxidant mixer via the recuperator, the solid oxide fuel cell stack being arranged to supply exhaust gases to the turbine and the turbine being arranged to supply the exhaust gases through the recuperator to heat the oxidant flowing through the recuperator.

2. A solid oxide fuel cell system as claimed in claim 1 wherein the compressor is arranged to supply a portion of the oxidant via the cooler to the additional compressor and the compressor is arranged to supply a portion of the oxidant to the additional turbine.

3. A solid oxide fuel cell system as claimed in claim 1 wherein the recuperator is arranged to supply a portion of the oxidant supplied by the additional compressor to the oxidant mixer and the recuperator is arranged to supply a portion of the oxidant supplied by the additional compressor to the additional turbine.

4. A solid oxide fuel cell system as claimed in claim 1 wherein the cooler is arranged to supply a portion of the oxidant supplied by the compressor to the additional compressor and the cooler is arranged to supply a portion of the oxidant supplied by the compressor to the additional turbine.

5. A solid oxide fuel cell system as claimed in claim 1 wherein the combustor is arranged to supply a portion of the combustor exhaust gases to the turbine.

6. A solid oxide fuel cell system as claimed in claim 5 wherein the combustor is arranged to supply the portion of the combustor exhaust gases to a first flow path through a heat exchanger and the oxidant mixer is arranged to supply the second portion of the unused oxidant from the cathode of the at least one solid oxide fuel cell back to the cathode of the at least one solid oxide fuel cell with the oxidant from the compressor through a second flow path through the heat exchanger.

7. A solid oxide fuel cell system as claimed in claim 6 wherein the additional compressor is arranged to supply oxidant to an additional mixer via the recuperator, the combustor is arranged to supply the combustor exhaust gases to the additional mixer, the additional mixer is arranged to supply oxidant and the combustor exhaust gases to the first flow path through the heat exchanger.

8. A solid oxide fuel cell system as claimed in claim 7 wherein the heat exchanger is arranged to supply a first portion of the combustor exhaust gases and oxidant leaving the first flow path through the heat exchanger to the combustor and the heat exchanger is arranged to supply a second portion of the combustor exhaust gases and oxidant leaving the first flow path through the heat exchanger to the turbine.

9. A solid oxide fuel cell system as claimed in claim 7 wherein the additional mixer is an additional ejector.

10. A solid oxide fuel cell system as claimed in claim 1 wherein the additional compressor is a fan or a blower.

11. A solid oxide fuel cell system comprising a solid oxide fuel cell stack and a gas turbine engine, the solid oxide fuel cell stack comprising at least one solid oxide fuel cell, each solid oxide fuel cell comprising an electrolyte, an anode and a cathode, the gas turbine engine comprising a compressor and a turbine arranged to drive the compressor, the compressor being arranged to supply oxidant to the cathode of the at least one solid oxide fuel cell via an oxidant mixer, the oxidant mixer being arranged to supply a portion of the unused oxidant from the cathode of the at least one solid oxide fuel cell back to the cathode of the at least one solid oxide fuel cell with the oxidant from the compressor through a heat exchanger, wherein the solid oxide fuel cell system further comprises an additional compressor and an additional turbine arranged to drive the additional compressor, the compressor being arranged to supply oxidant to the additional compressor, the additional compressor being arranged to supply oxidant to the oxidant mixer and the solid oxide fuel cell stack being arranged to supply exhaust gases to the turbine, wherein the cathode is arranged to supply a portion of the unused oxidant directly into the oxidant mixer without passing through a combustor, wherein the oxidant mixer is an oxidant ejector, and wherein the solid oxide fuel cell system further comprises a cooler and a recuperator, the compressor being arranged to supply oxidant via the cooler to the additional compressor, the additional compressor being arranged to supply oxidant to the oxidant mixer via the recuperator, the solid oxide fuel cell stack being arranged to supply exhaust gases to the turbine and the turbine being arranged to supply the exhaust gases through the recuperator to heat the oxidant flowing through the recuperator.

* * * * *